US008862315B2

(12) United States Patent
Espinosa et al.

(10) Patent No.: US 8,862,315 B2
(45) Date of Patent: Oct. 14, 2014

(54) SYSTEMS AND METHODS FOR PROCESSING OPERATIONAL GEAR DATA OF A VEHICLE

(71) Applicant: Omnitracs, LLC, San Diego, CA (US)

(72) Inventors: Alfonso J. Espinosa, San Diego, CA (US); Rajendra K. Somia, San Diego, CA (US); Ernest Basin, San Diego, CA (US)

(73) Assignee: Omnitracs, LLC, San Diego, CA (US)

( * ) Notice: Subject to any disclaimer, the term of this patent is extended or adjusted under 35 U.S.C. 154(b) by 0 days.

(21) Appl. No.: 13/623,588

(22) Filed: Sep. 20, 2012

(65) Prior Publication Data

US 2013/0079975 A1 Mar. 28, 2013

Related U.S. Application Data

(60) Provisional application No. 61/538,689, filed on Sep. 23, 2011.

(51) Int. Cl.
*G01M 17/00* (2006.01)
*G07C 5/08* (2006.01)
*G07C 5/00* (2006.01)

(52) U.S. Cl.
CPC .............. *G07C 5/0841* (2013.01); *G07C 5/008* (2013.01); *G07C 5/0816* (2013.01)
USPC ........................................................ 701/33.4

(58) Field of Classification Search
CPC ............................ G07C 5/0808; G07C 5/0841
USPC ........................................................ 701/33.4
See application file for complete search history.

(56) References Cited

U.S. PATENT DOCUMENTS

| | | | | |
|---|---|---|---|---|
| 5,612,672 | A | 3/1997 | Ino et al. | |
| 7,062,368 | B2 | 6/2006 | Ho et al. | |
| 7,469,612 | B2 | 12/2008 | Rouphael et al. | |
| 2004/0002806 | A1 | 1/2004 | Bellinger | |
| 2005/0027423 | A1 * | 2/2005 | Minami et al. | 701/51 |

FOREIGN PATENT DOCUMENTS

| | | | |
|---|---|---|---|
| EP | 1498297 | A1 | 1/2005 |

* cited by examiner

*Primary Examiner* — James Trammell
*Assistant Examiner* — Michael D Lang
(74) *Attorney, Agent, or Firm* — Arent Fox LLP

(57) ABSTRACT

Systems and methods to process vehicle operation data are described. A data module associated with a vehicle can collect operation data relating to the gear operation of the vehicle. The data module can process the operation data to identify a top gear of the vehicle and determine the current gear at which the vehicle is operating. The data module can process the operation data to determine an amount of time that the vehicle operates in top gear. The data module can provide the data to an operator of the vehicle, or to a remote management center, for storage and/or further processing.

50 Claims, 7 Drawing Sheets

SYSTEMS AND METHODS FOR PROCESSING OPERATIONAL GEAR DATA OF A VEHICLE

CLAIM OF PRIORITY UNDER 35 U.S.C. §119

The present Application for Patent claims priority to Provisional Application No. 61/538,689 entitled "systems and methods for PROCESSING OPERATIONAL GEAR DATA OF A VEHICLE", filed Sep. 23, 2011, and assigned to the assignee hereof and hereby expressly incorporated by reference herein.

FIELD

This invention generally relates to systems and methods for analyzing vehicle operating data. More particularly, this invention relates to platforms and techniques for gathering and processing data related to vehicles operating in a top gear.

BACKGROUND

Vehicle fleet managers or administrators manage several expenses associated with overseeing operation of the vehicles of the fleet. For example, fuel costs are an expense that managers, or vehicle operators themselves, face on a recurring basis. Fuel costs, exacerbated by a prospect of rising fuel costs, can incentivize managers and operators to reduce costs associated with fuel consumption. Further, owners or operators of consumer vehicles or other units are also motivated to reduce costs associated with fuel consumption.

The miles per gallon (MPG) metric associated with a vehicle can be an indication of the efficiency of a vehicle operator, or other factors. For example, the higher the MPG of a vehicle, the more miles the vehicle gets out of a tank of gas, and as a result, the associated fuel cost is reduced. For further example, if a first vehicle operator operates a vehicle at a lower MPG than does a second vehicle operator, then the fuel costs associated with the first vehicle operator operating the vehicle are higher.

Typical vehicles include multiple gears that are switched to during operation of the vehicle. Usually, as the speed of the vehicle increases, the vehicle transmission will increase the gear that the vehicle is in, up to what is known as the vehicle's "top gear." More particularly, the transmission allows the gear ratio between the vehicle engine and the drive wheels to change as the vehicle increases or decreases speed. Further, gear shifts allow the vehicle engine to remain near the revolutions per minute (RPM) band of the vehicle's best performance. Typically, a vehicle experiences its most efficient MPG operation when the vehicle is operating in its top gear. More particularly, the vehicle can have the most efficient MPG at or near the point at which the vehicle switches to its top gear.

Currently, vehicle fleet managers or vehicle operators have no information related to when a vehicle switches into top gear, or how much time the vehicle operates in top gear. A need therefore exists for systems and methods for providing information related to vehicles operating in top gear. More particularly, a need exists for platforms and techniques for reducing fuel-related costs by analyzing data associated with gear operation of a vehicle.

SUMMARY

Implementations are directed to systems and methods for processing data associated with a vehicle. According to implementations in one regard, a top gear of a vehicle is identified. In operation, a current gear of the vehicle is detected during an operation of the vehicle. Various implementations further relate to determining whether the current gear matches the top gear and collecting operation data of the vehicle during the operation of the vehicle in the current gear if the current gear matches the top gear.

BRIEF DESCRIPTION OF THE DRAWINGS

The accompanying drawings, which are incorporated in and constitute a part of this specification, illustrate implementations of the present disclosure and together with the description, serve to explain the implementations.

DETAILED DESCRIPTION

Figure 1:
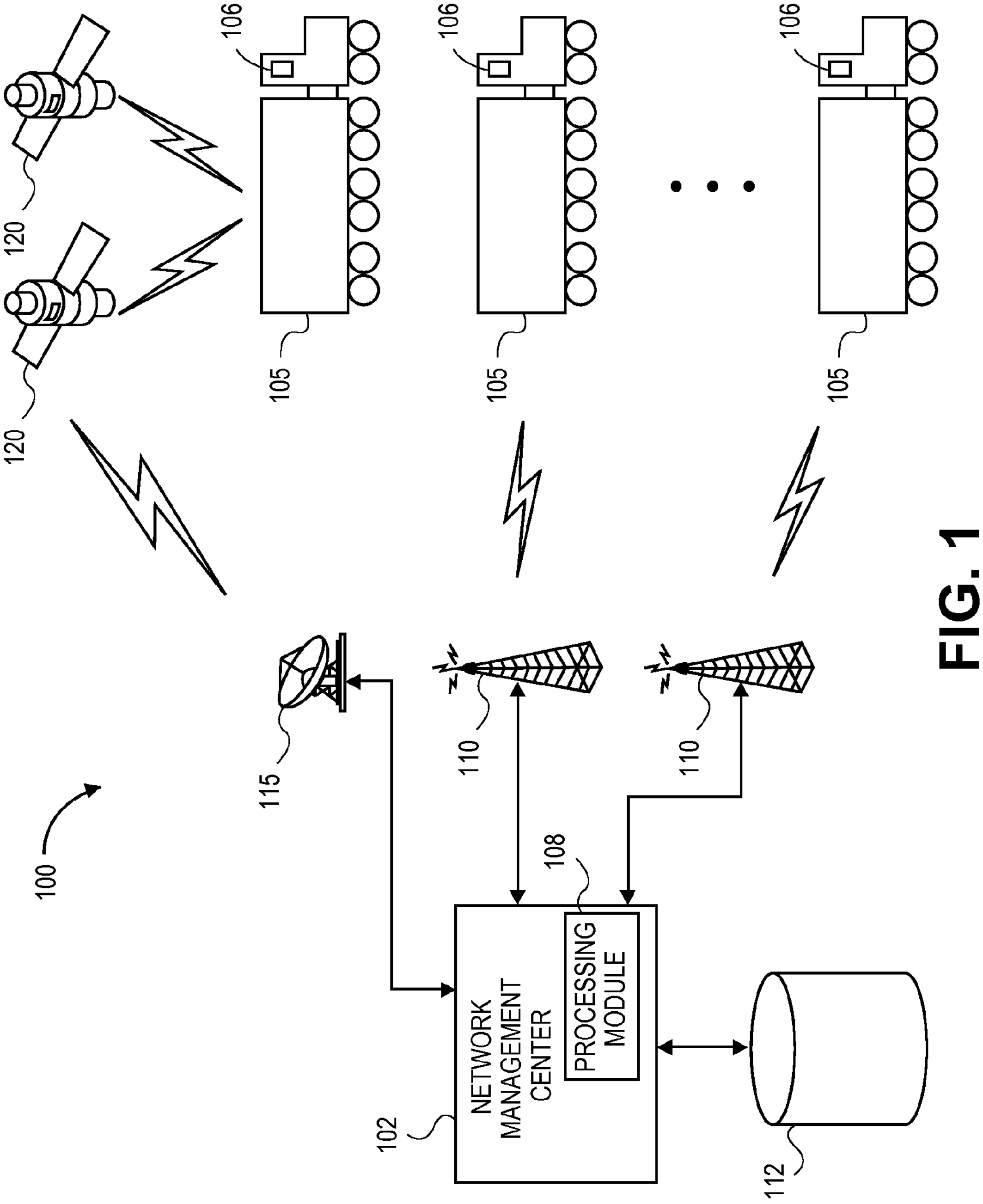
FIG. 1 illustrates a functional block diagram of an exemplary data processing system according to various implementations.

Implementations are directed towards systems and methods for processing vehicle data. In particular, the systems and methods can processes data associated with gear operation of the vehicle to help reduce fuel-related costs and other costs. The systems and methods can allow vehicle managers, administrators, or operators to adjust driving schedules, assignments, or general operation techniques in response to data processing results. The systems and methods according to the present teachings can be implemented as software or hardware on new or existing devices, and/or on new or existing management servers, applications, or other resources.

Vehicles as described herein can be understood to be any type of truck, car, motorcycle, scooter, or any other mobile unit configured with a gas, hybrid-type, or electric engine. Further, as described herein, the term "revolutions per minute" ("RPM") can refer to the operation of a vehicle engine, and more particularly to the frequency of rotation associated with the vehicle engine. Further, as described herein, the term "gear ratio" ("GR") can refer to a value derived from a speed of a vehicle, the RPM of the vehicle engine, and optional additional values. Further, as described herein, the "SensorTRACS" application available from Qualcomm® Inc. can refer to an application or interface operating on a vehicle on which a vehicle operator can register, log in, log out, and perform various operations and calculations. Further, the SensorTRACS application can collect, analyze, and transmit data associated with operation of the vehicle.

Further, as described herein, the term "top gear" ("TG") can refer to the highest gear of a vehicle. For example, if the highest gear of a vehicle is the fifth gear, then the TG can be said to be five (5). Further, as used herein, the term "time in top gear" ("TiTG") can be a value that can refer to an amount of time that a vehicle operates in top gear. In implementations, TiTG can be a cumulative value that sums one or more instances of top gear operation. Further, as used herein, the term "top gear gear ratio" ("TGGR") can refer to a value derived from a speed of a vehicle, the RPM of the vehicle engine, and optional additional values, while the vehicle is operating in top gear.

According to implementations, a module coupled to the vehicle can be configured to collect vehicle operating data such as, for example, the speed of the vehicle, the top gear of the vehicle, the current gear in which the vehicle is operating, and others. The module can process the data to determine vehicle metrics such as, for example, RPM, GR, TG, TiTG, TGGR, and other values. In implementations, the vehicle module can provide the metrics to a remote management center, server, and/or the like, via one or more networks. The remote management center can be configured to process any data received from the vehicle module, generate associated reports or interfaces, and provide and processed or generated data to a user, administrator, vehicle operator, and/or the like.

Reference will now be made in detail to exemplary implementations of the disclosure, an example of which is illustrated in the accompanying drawings. Wherever possible, the same reference names and numbers will be used throughout the drawings to refer to the same or like parts.

In the following description, reference is made to the accompanying drawings that form a part thereof, and in which is shown by way of illustration-specific exemplary implementations. These implementations are described in sufficient detail to enable those skilled in the art to practice the implementations, and it is to be understood that other implementations can be used and that changes can be made without departing from the scope of this disclosure. The following description is, therefore, merely exemplary.

FIG. 1 illustrates a block diagram of an exemplary data processing system 100 consistent with various implementations. As shown in FIG. 1, system 100 can comprise a network management center 102 configured to communicate with one or more vehicles 105. In implementations, each of the vehicles 105 can comprise a data module 106 configured to collect and transmit data associated with the operation of the vehicles 105. In implementations, the data module 106 can be configured to perform calculations associated with any of the data collected. Further, in implementations, the data module 106 can be configured with a repository (not shown in figures) configured to store any data associated with the data module 106.

The network management center 102 can be configured to communicate with the data module 106 of the vehicles 105 via one or more networks. As shown in FIG. 1, the network can be a satellite dish 115 operating with one or more satellites 120. In implementations, the data module 106 can use a modem or other communication device to communicate with the satellites 120, which can relay the data to the satellite dish 115 at a ground station. Further, as shown in FIG. 1, the network can comprise one or more base stations 110 configured to facilitate data communication among the vehicles 105 and the network management center 102. For example, the base stations 110 can be configured to connect to a modem or other communication device of the data module 106 via any number of wireless data systems and methods (e.g. GSM, CDMA, TDMA, WCDMA, EDGE, OFDM, GPRS, EV-DO, WiFi, Bluetooth, WiMAX, UWB, PAN, and others). In implementations, the satellite dish 115 and the base stations 110 can be configured to connect to the network management center 102 locally or remotely via wired or wireless connections. Further, in implementations, lower-bandwidth data can be sent via the satellites 120 and higher-bandwidth data can be sent via the base stations 110. It should be appreciated that the satellites 120, base stations 110, and satellite dish 115 can use any data network to direct the communication of any amount of data from the data module 106 to the network management center 102, and vice-versa.

In implementations, the data module 106 of the vehicles 105, or other logic, can be configured to receive operating data associated with the vehicles 105. For example, the data module 106 can be configured to collect any location-based or operational-based data associated with the vehicles 105 such as, for example, speed, RPM, TG, current gear, and other data. In implementations, the operating data can be sensed by one or more sensors positioned on or otherwise coupled to one or more components of the vehicles 105. For example, a sensor can be coupled to an engine of the vehicles 105, or other components, and configured to sense the gear in which the vehicles 105 are operating. It should be appreciated that other sensors or data gathering devices configured to sense gear operation data, or other data, can be placed or positioned on any part of the one or more vehicles 105. For example, the sensors can be configured to sense or detect the current gear in which the vehicles 105 are operating, and identify what the actual top gear (TG) is of the vehicles 105.

According to implementations, the data module 106 can be configured to sense, or use other collected operational data to calculate or process an amount of time that the vehicles 105 spend operating in top gear (TiTG). In implementations, the TiTG data can be gathered, recorded, sensed, processed, or the like over a specified or indefinite time period. For example, the TiTG data can be collected over a daily, weekly, monthly, or any other time period. For further example, the TiTG data can be a cumulative value over a single trip of the vehicle 105, wherein the TiTG only accounts for when the vehicle 105 is operating in TG. Further, the TiTG data can be dependent on the driver or operator of the vehicle. For example, the vehicle operator can sign in or log into the SensorTRACS application available from Qualcomm® Inc, and the TiTG data can be collected and/or processed when the vehicle operator is logged into the application. By examining the SensorTRACS activity, the TiTG data can be associated with particular drivers who operate any of the vehicles 105. For example, if multiple drivers operate the same vehicle over a specified time period, then the login and logout activity of the drivers can be used to determine which drivers are associated with which TiTG data, or other metrics.

The data modules 106 of the vehicles 105 can be configured to compile and calculate metrics associated with the TiTG data, or other data. For example, the data modules 106 can be configured to aggregate TiTG data collected at different points during operation of the vehicles 105. For further example, the modules 106 can be configured to calculate the gear ratio (GR) and the top gear gear ratio (TGGR) using the data collected from the sensors or other data gathering modules. In implementations, the data modules 106 can be configured to provide or otherwise transmit the data from the sensors, or any aggregated or calculated data, to the network management center 102 via the base stations 110, the satellite dish 115, the satellites 120, or any combination thereof, as discussed herein.

The network management center 102 can be configured to receive data from one or more of the data modules 106 via the base stations 110, the satellite dish 115, the satellites 120, or any combination thereof. In implementations, the network management center 102 can be configured with a processing module 108 that can compile or perform calculations on data received from the data modules 106. For example, the processing module 108 can receive raw data collected by the sensors of the vehicles 105 and can compile the raw data into data indicating the gear operation of the vehicles 105, TiTG data, driver operation events, and other data. For further example, the processing module 108 can receive data that was previously compiled or calculated by the data modules 106 of the vehicles 105.

In implementations, the processing module 108, any of the data modules 106, or other logic can be configured to calibrate the data modules 106 of the vehicles 105. Further, in implementations, different calibration techniques can be required depending on the type of data module 106, type of vehicle 105, or other factors. In particular, the vehicle 105 can have a semi-automatic or fully automatic transmission, and the data module 106 of the vehicle 105 can be configured to provide current gear and transmission configuration data on a corresponding data bus, such as the J1939/CAN bus that can be available in trucks, which is referred to herein as Configuration 1. In another example, the vehicle 105 can have a semi-automatic or fully automatic transmission, and the data module 106 of the vehicle 105 can be configured to provide current gear, but not transmission configuration data, on a corresponding data bus, such as the J1939/CAN bus that can be available in trucks, which is referred to herein as Configuration 2. Further, the vehicle 105 can have a manual transmission, or other transmissions, and the data module 106 of the vehicle 105 does not provide either current gear or transmission configuration data on a corresponding data bus, such as the J1587 bus that can be available in some trucks, which is referred to herein as Configuration 3.

If the vehicle 105 is configured according to Configuration 1, the TiTG data associated with the vehicle 105 can be determined or processed via data collected by the data module 106, or other components. The data module 106 can detect or determine the highest possible gear for the vehicle 105 via data on a communication bus, such as the J1939/CAN bus, or others. In particular, in accordance with the J1939/CAN bus specification, the PGN FEE2 location can specify a number of forward gear ratios of the vehicle 105, which can indicate the top gear of the vehicle 105. Further, in accordance with the J1939/CAN bus specification, the PGN 61445 location can specify the current gear of the vehicle 105. In implementations, the data module 106, or other logic, can sample the forward gear ratio and top gear data of the vehicle, and compare the data to the top gear of the vehicle 105 to determine if the vehicle 105 is operating in its top gear. In implementations, the data module 106 can process the collected or sampled data, to, for example, determine the TiTG of the vehicle 105, or provide the collected or sampled data to the network management center 102, as described herein, for further processing.

Figure 2:
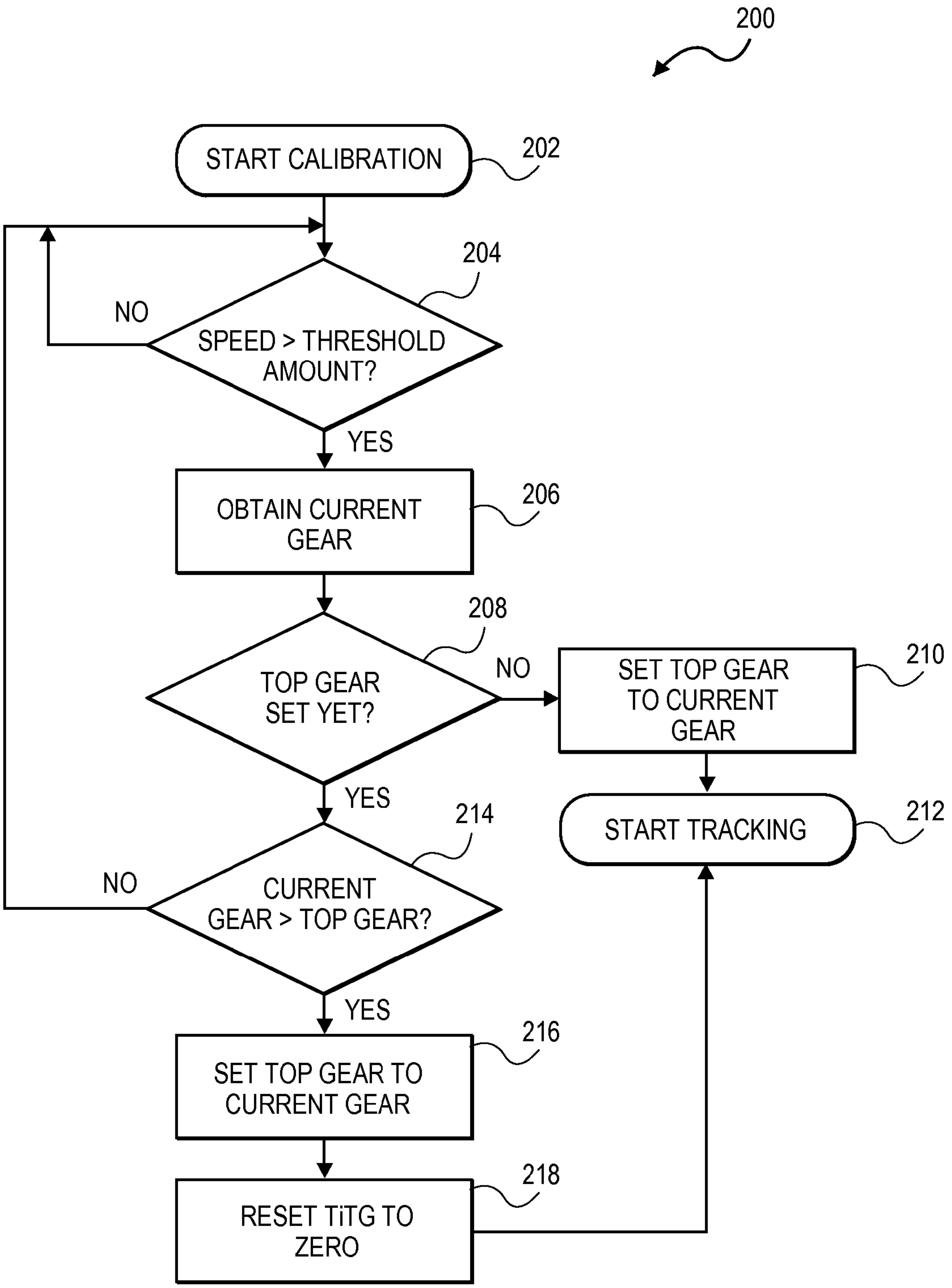
FIG. 2 is a flow diagram illustrating a process of processing vehicle data according to various implementations.

FIG. 2 illustrates a flow diagram illustrating a process 200 of calibrating a vehicle that is configured according to Configuration 2. In particular, the calibration can be performed to determine what the highest possible gear is for the vehicle. In implementations, the calibration can be performed by any logic or device on a vehicle that does not broadcast or otherwise provide a current gear of the vehicle. However, it should be appreciated that the calibration can be performed on any vehicle. It should be apparent to those of ordinary skill in the art that the diagram depicted in FIG. 2 represents a generalized illustration and that other processing may be added or existing processing can be removed or modified.

Process 200 begins at 202 when, for example, an operator or administrator starts a calibration routine of the vehicle. In implementations, the calibration can start automatically when the vehicle ignition is switched on. The speed of the vehicle can be checked and compared with a threshold amount such as, for example, 50 miles/hour, in 204. It should be appreciated that the threshold amount is merely an exemplary amount and can be set to any amount so as to approximate the speed at which a vehicle will be operating in top gear.

If the speed of the vehicle is not greater than the threshold amount, or presumably when the vehicle is not operating in top gear, then processing can proceed back to 204 in which the speed of the vehicle can again be compared to the threshold amount. In contrast, if the speed of the vehicle is greater than the threshold amount, or presumably when the vehicle is operating in top gear, then processing can proceed to 206 in which the current operating gear of the vehicle can be obtained. For example, if the vehicle is traveling over the threshold amount, and the vehicle is operating in the fifth gear, then the current gear is the fifth gear. In implementations, an indication of the current gear can be stored in local memory, or transmitted to an management or monitoring station, as discussed herein.

In 208, a flag, record, or the like can be checked to determine if a top gear associated with the vehicle has been set. In implementations, the vehicle can have an associated flag, record, or the like that indicates the top gear of the car. If no top gear has been set, or the flag, record, or the like associated with the vehicle is null, then the top gear of the vehicle can be set to the current gear, in 210. In implementations, the top gear flag, record, or the like, of the vehicle can be set as the current gear. Once the top gear of the vehicle is set to the current gear, processing can proceed to 212 at which the top gear tracking processing can begin.

In contrast, if the top gear of the vehicle has been set, then the current gear of the vehicle can be compared to the top gear of the vehicle, in 214. If the current gear is not greater than the top gear, then processing can proceed back to 204 in which the speed of the vehicle can be monitored and compared to the threshold amount. In implementations, the threshold amount can be increased. For example, if the current speed of the vehicle is greater than 50 miles/hour, and the vehicle is not in top gear, then the threshold amount of processing step 204 can be increased to 60 miles/hour, or other amounts. In further implementations, if the current gear is equal to the top gear, then processing can proceed to 212 at which the top gear tracking processing can begin. In contrast, if the current gear is greater than the top gear associated with the vehicle, then the top gear of the vehicle can be set to the current gear of the vehicle, in 216. For example, if the top gear of the vehicle is recorded as the fifth gear, and the current gear of the vehicle is the sixth gear, then the top gear can be recorded to be the sixth gear.

In response to setting the top gear to the current gear in 216, any TiTG data associated with the vehicle can be cleared or otherwise reset to zero, in 218. In implementations, the existing TiTG data is cleared because the existing TiTG is inaccurate, presumably because it was collected when the vehicle was not operating in the actual top gear. In response to clearing the existing TiTG data, processing can proceed to 212 at which the top gear tracking processing can begin.

In implementations, once the top gear tracking processing is started, in 212, the current gear of the vehicle can be compared to the top gear associated with the vehicle, and, if equal, the TiTG data can be updated. If the current gear is not equal to the top gear, then the TiTG data is not updated. In further implementations, if a reset button, termination switch, or the like button is activated, then the calibration process 200 can reset, end, or return to any of the processing steps. Further, in implementations, a new vehicle can be detected when either a new vehicle identification number (VIN) is detected or, if no VIN is available, if a new odometer reading is detected that is different from a last saved odometer reading by more than 10%.

Figure 3A:
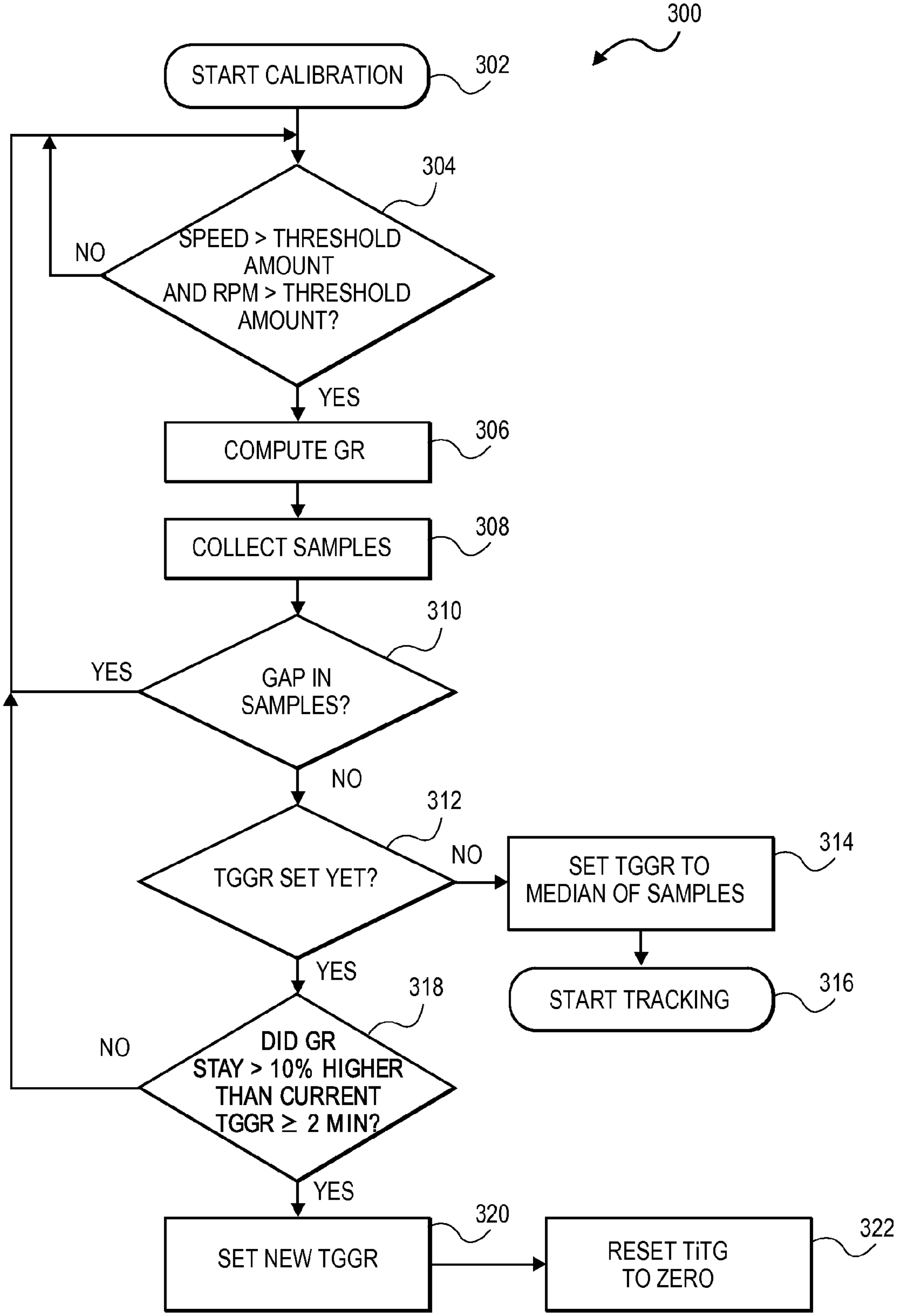
FIG. 3A is a flow diagram illustrating a process of processing vehicle data according to various implementations.

FIG. 3A illustrates a flow diagram illustrating a process 300 of calibrating a vehicle that is configured according to Configuration 3. In particular, the calibration can be performed to determine what the current operating gear is for the vehicle. In implementations, the calibration can be performed by any logic or device on a vehicle that does not broadcast or otherwise provide either a current gear or transmission configuration data of the vehicle. However, it should be appreciated that the calibration can be performed on any vehicle. It should be apparent to those of ordinary skill in the art that the diagram depicted in FIG. 3A represents a generalized illustration and that other processing may be added or existing processing can be removed or modified.

Process 300 begins at 302 when, for example, an operator or administrator starts a calibration routine of the vehicle. In implementations, the calibration can start automatically when the vehicle ignition is switched on. The speed of the vehicle can be compared with a threshold amount such as, for example 50 miles/hour, and the RPM of the engine of the vehicle can be checked and compared with a threshold amount such as, for example, 1,000, in 304. It should be appreciated that the threshold amounts are merely exemplary amounts and can be set to any amounts so as to approximate the speed and RPM at which a vehicle will be operating in top gear.

If either the speed of the vehicle is at or below the threshold speed amount or the RPM of the vehicle is at or below the threshold RPM amount, or presumably when the vehicle is not operating in top gear, then processing can return to 304 in which the speed of the vehicle and the RPM of the vehicle can again be compared to the threshold amounts. In contrast, if both the speed of the vehicle is above the threshold speed amount and the RPM of the vehicle is above the threshold RPM amount, or presumably when the vehicle is operating in top gear, then processing can proceed to 306 in which the gear ratio (GR) can be computed. In implementations, the GR can be computed using a formula:

$$GR = \left(\frac{\text{Speed}}{RPM}\right) * 3000$$

In implementations, the constant of '3000' can be other values. Once the GR is computed, samples can be collected from the vehicle for a specified time period such as, for example, 2 minutes, in 308. In implementations, the samples can comprise speed and RPM measurements for the vehicle, and can be collected over any time period. In 310, the samples can be checked for a gap. For example, a gap in the sample data can be defined as an absence of more than 6 samples from the 2 minute sampling collecting window. However, it should be appreciated that the gap can be checked from any number of samples over any time period. If there is a gap in the samples, then processing can return to 304 in which the speed of the vehicle and the RPM of the vehicle can again be compared to the threshold amounts.

In contrast, if there is not a gap in the samples, then processing can proceed to 312 in which a flag, record, or the like can be checked to determine whether the TGGR data has been set. In implementations, the vehicle can have an associated flag, record, or the like that indicates or stores a TGGR value for the vehicle. If no TGGR has been set, or the flag, record, or the like associated with the vehicle is null, then the TGGR of the vehicle can be set to a median value of the collected samples, in 314. In implementations, the TGGR of the vehicles can be set to other values, either associated or unassociated with the data from the collected samples. Once the TGGR of the vehicle is set, processing can proceed to 316 at which the top gear tracking processing can begin.

In contrast, if the TGGR of the vehicle has been set, then it can be determined whether the GR stayed at least 10% higher than the current TGGR value for at least 2 minutes, in 318. In implementations, it should be appreciated that the amounts used in the comparison can be any value. If the GR did not stay at least 10% higher than the current TGGR value for at least 2 minutes, then processing can return to 304 in which the speed of the vehicle and the RPM of the vehicle can again be compared to the threshold amounts. In contrast, if the GR stayed at least 10% higher than the current TGGR value for at least 2 minutes, then a new TGGR can be set, in 320. In implementations, the new TGGR can be computed from the speed and RPM measurements, or other values.

In response to setting TGGR in 320, the TiTG data of the vehicle can be cleared or otherwise reset to zero, in 322. In implementations, the existing TiTG data is cleared because the existing TiTG is inaccurate, presumably because it was collected when the vehicle was not operating in the actual top gear. In response to clearing the existing TiTG data, processing can proceed to 302 in which the calibration process 300 can repeat, can proceed to 316 at which the top gear tracking processing can begin, or processing can end or proceed to any of the other stages. In implementations, if a reset button, termination switch, or the like button is activated, then the calibration process 300 can be reset, can reset, or return to any of the processing points.

Figure 3B:
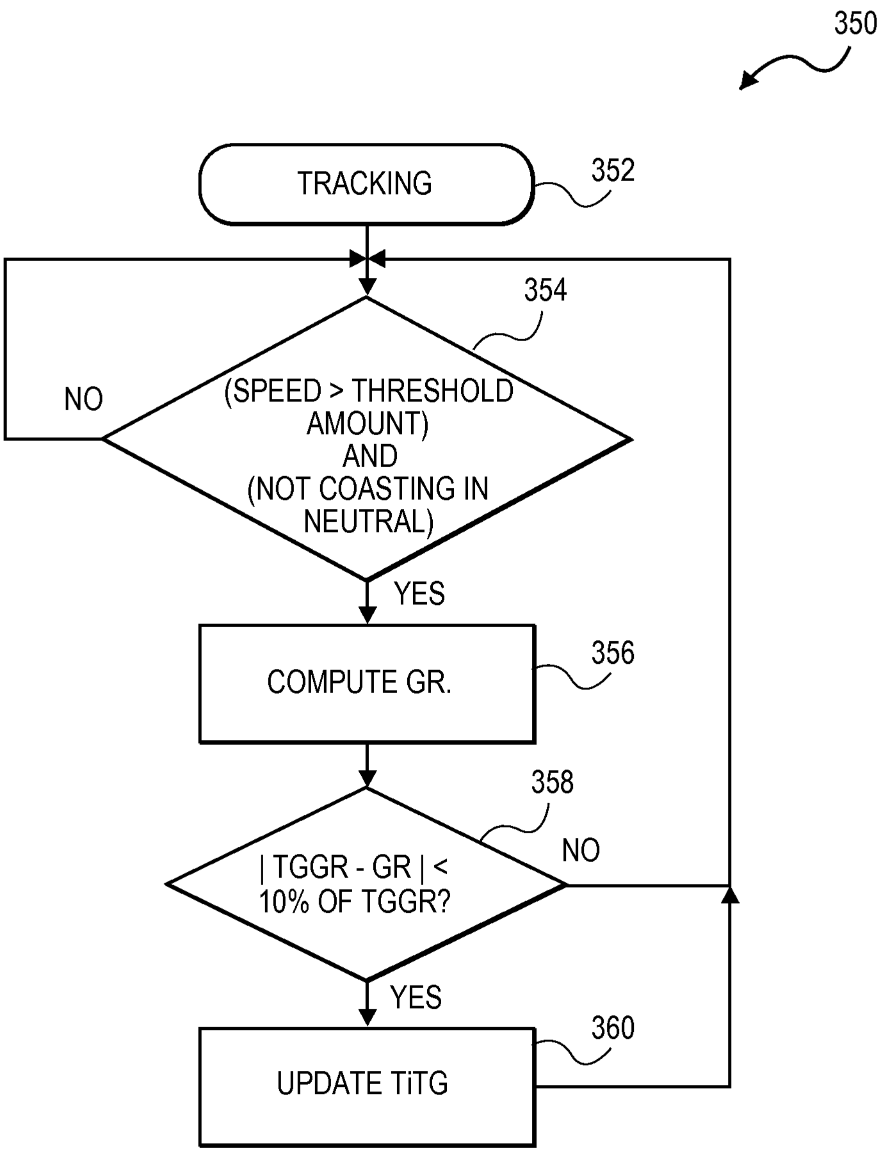
FIG. 3B is a flow diagram illustrating a process of processing vehicle data according to various implementations.

FIG. 3B illustrates a flow diagram illustrating a TiTG tracking process 350. It should be apparent to those of ordinary skill in the art that the diagram depicted in FIG. 3B represents a generalized illustration and that other processing may be added or existing processing can be removed or modified.

Process 350 begins at 352 when, for example, an operator or administrator starts a tracking routine of the vehicle. In implementations, the process 350 can begin automatically when the conditions as described in FIG. 3A, or other conditions, are achieved. In 354, it can be determined whether the vehicle is traveling at a speed greater than a threshold amount, such as, for example, 40 miles/hour, and whether the car is not coasting in neutral gear. It should be appreciated that other threshold values are envisioned. If either the speed of the vehicle does not meet or exceed the threshold value or the vehicle is coasting in neutral gear, then processing can remain at step 354. In contrast, if both the speed of the vehicle exceeds the threshold amount and the vehicle is not coasting in neutral, then processing can proceed to 356 in which the GR of the vehicle can be computed. In implementations, the GR can be computed using a formula:

$$GR = \left(\frac{\text{Speed}}{RPM}\right) * 3000$$

In implementations, the constant of '3000' can be other values. Once the GR is computed, processing can proceed to 358 in which it can be determined whether the absolute value of (TGGR−TR) is less than 10%, or other threshold percentages, of the TGGR value. If the absolute value of (TGGR−TR) is not less than 10% of the TG GR value, the processing can return to step 354. In contrast, if the absolute value of (TGGR−TR) is less than 10% of the TG GR value, then processing can proceed to 360 in which the TiTG data is updated. Processing can then end, return to step 354, or return to any other processing step.

Figure 4:
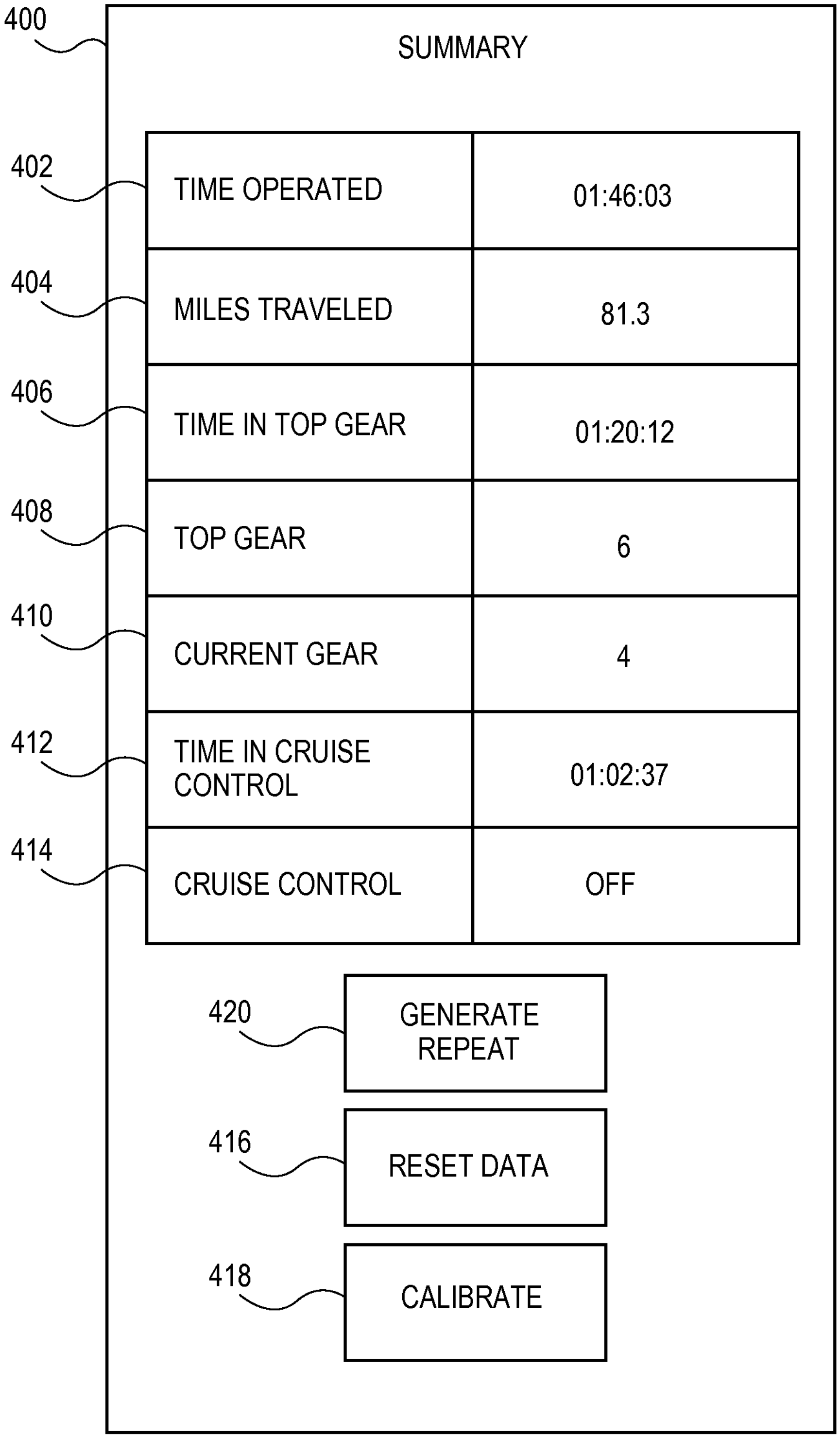
FIG. 4 illustrates an exemplary user interface used in processing vehicle data according to various implementations.

In implementations, the data of any of the calibration or tracking processes or techniques can be provided to a user. For example, the data can be provided to an operator of the vehicle, or to a user or administrator associated with the network management center 102 via, for example, a graphical user interface (GUI). FIG. 4 illustrates an exemplary graphical user interface 400 that can be implemented in each of the vehicles 105, or provided to any components or resources associated with the implementations as discussed herein. In implementations, the graphical user interface 400 can be a display screen, touch screen, or other medium for displaying information to a driver of the vehicle or other users. Further, the data of the graphical user interface 400 can be displayed on a smart phone, laptop, personal data assistant (PDA), cellular phone, or other device, and can be provided to resources of a remote location, such as client machines or other resources associated with the network management center 102. It should be appreciated that the graphical user interface 400 as shown in FIG. 4 is merely exemplary and other displays are envisioned.

In implementations, the graphical user interface 400 can be a summary of the operating data of a vehicle gathered over a fixed or varied time period. In implementations, the data of the graphical user interface 400 can be recorded when the engine of the vehicle is turned on, or when a driver of the vehicle logs on to a tracking application, such as the SensorTRACS application. Further, the data of the graphical user interface 400 can be an accumulation of data gathered over a series of driving sessions, or the data can be limited to the current driving session or login/logout event.

As shown in FIG. 4, the graphical user interface 400 can comprise a time operated field 402 that can indicate the amount of time that the vehicle has been in operation. Further, a miles traveled field 404 can indicate an amount of miles that the vehicle has traveled. In addition, the summary can comprise a time in top gear field (TiTG) 406 that can indicate the amount of time that the vehicle has operated in its top gear. For example, the TiTG field 406 can specify a cumulative amount of time that the vehicle has operated in its top gear, accounting for downshifts from the top gear and upshifts into the top gear.

Still further, a top gear field 408 can indicate the top gear of the vehicle and a current gear field 410 can indicate the current gear in which the vehicle is operating. For example, as shown in FIG. 4, the top gear of the corresponding vehicle is the sixth gear and the current operating gear of the vehicle is the fourth gear. Additionally, the summary can comprise a time in cruise control field 412 that can indicate the amount of time that the vehicle is operating in cruise control and a cruise control field 414 that can indicate whether the cruise control of the vehicle is currently engaged.

It should be appreciated that the graphical user interface 400 can comprise other data instead of or in addition to the data fields shown in FIG. 4. For example, the graphical user interface 400 can comprise an indication of the data bus of the vehicle, a moving time that can indicate the amount of time that the vehicle is actually in movement, a percent of the operating time spent in top gear, a top gear ratio of the vehicle, a current gear ratio, and other data. In implementations, the graphical user interface 400 can dynamically update based on updates to the gathered data, or other modifications. For example, if the top gear of the vehicle is unknown, then the time in top gear 406 field and the top gear field 408 can be grayed out. Further, for example, if the unit is not in top gear, but the top gear is known, then the time in top gear 406 field and the top gear field 408 can be displayed in yellow. Still further, for example, if the vehicle is operating in top gear, then the time in top gear 406 field and the top gear field 408 can be green and accumulating. It should be appreciated that other modifications and conventions associated with displaying data statically or dynamically are envisioned.

As shown in FIG. 4, the graphical user interface 400 can comprise a reset data button 416 that, when activated or selected, can be configured to reset or clear the data of the graphical user interface 400. Further, the graphical user interface can comprise a calibrate button 418 that, when activated, can initiate the appropriate calibration process as described in FIGS. 2, 3A, and 3B. Still further, the graphical user interface 400 can comprise a generate report button 420 that, when activated, can generate a report of the data associated with the graphical user interface 400. In implementations, the report can comprise the data currently displayed by the graphical user interface 400 and/or any stored or past data. Further, in implementations, the report can be provided to any user, operator, owner or other entity associated with the vehicle or a management center via any type of network communication. It should be appreciated that the graphical user interface 400 can comprise other selectable buttons instead of or in addition to the buttons shown in FIG. 4.

In implementations, the systems and methods as described herein can allow vehicle managers, administrators, or operators to adjust driving schedules, assignments, or general operation techniques in response to data processing results. For example, if the operation data of the vehicle indicates that a first driver operating a vehicle has a higher TiTG than does a second driver operating the same vehicle, then the vehicle manager can schedule the first driver to operate the vehicle. Further, the vehicle manager can use the data processing results to adjust routes and time schedules of drivers so as to minimize any associated fuel efficient costs, and/or other costs. It should be appreciated that the vehicle manager or other entities such as a vehicle operator can use the data processing results to make any type of changes, adjustments, or other modifications to the management or operation of one or more vehicles.

Figure 5:
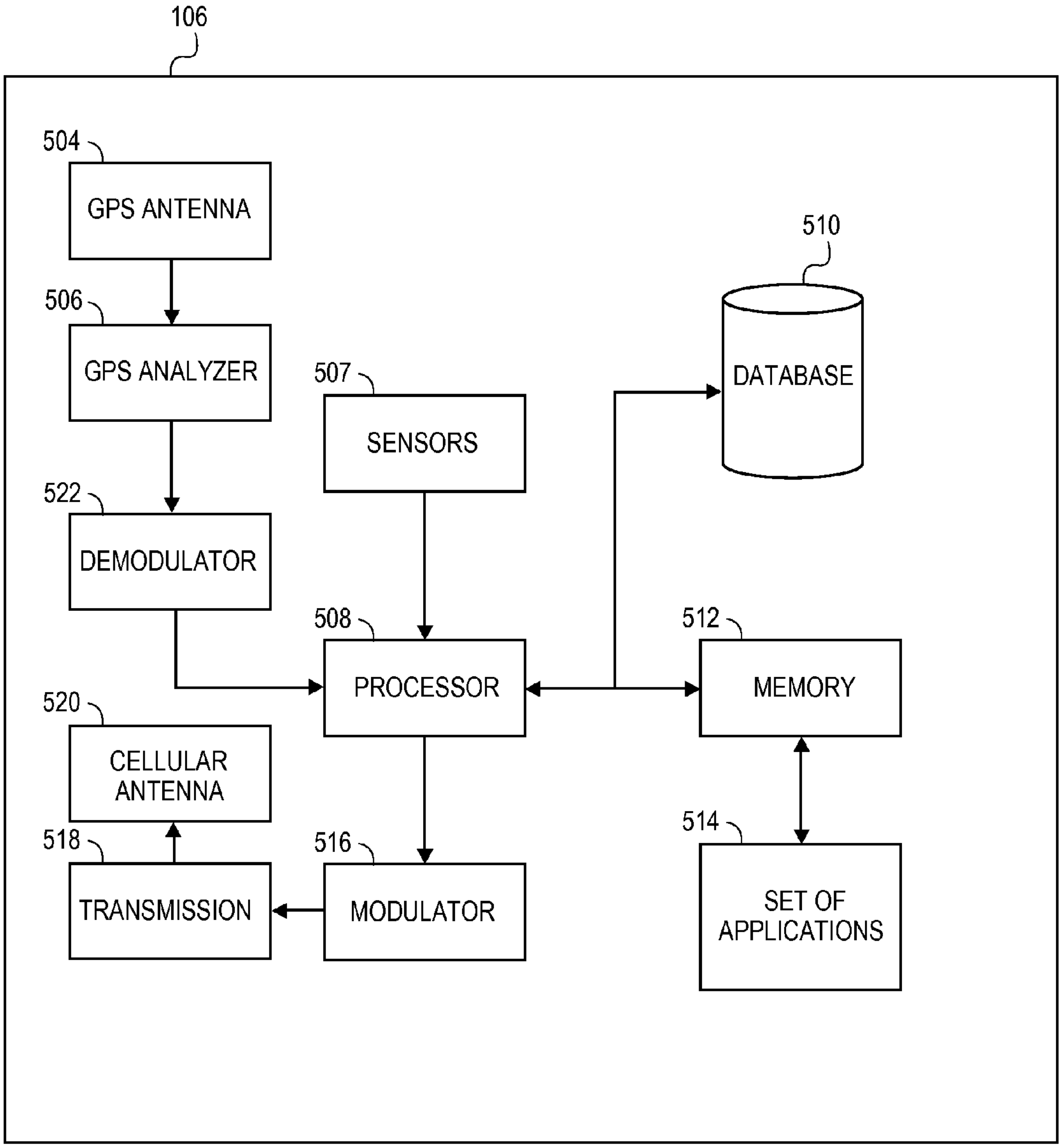
FIG. 5 illustrates an exemplary hardware configuration of a module used in processing vehicle data according to various implementations.

FIG. 5 illustrates an exemplary hardware configuration of the data module 106 or other module associated with the vehicle 105, consistent with various implementations. The data module 106 can comprise a set of sensors 507 that can be configured to sense operational data associated with the vehicle 105, as discussed herein, and provide the data to a processor 508 for processing. The data module 106 can further comprise at least one GPS antenna 504 (e.g., a transmission receiver or group of such receivers comprising an input interface) that can act as a wave guide for receipt of wireless GPS position coordinates or signals, and a GPS analyzer 506, which performs actions (e.g., filters, amplifies, down-converts, etc.) on the received signals. The GPS antenna 504 and the GPS analyzer 506 can also be coupled with a demodulator 522 that can demodulate received signals and provide them to the processor 508 for processing. The data module 106 can additionally include memory 512 that is operatively coupled to the processor 508 and that can store data to be transmitted, received, and the like.

The processor 508 can be configured to analyze information received by GPS antenna 504 and or the sensors 507 and/or a user input interface of data module 106 (not depicted), and/or generate information for transmission by a transmitter 518 via a modulator 516. The processor 508 can connect to a database 510 that can store location and vehicle operational data including, for example, roadway location information, TiTG data, current gear and TG data, user log in and log out events, and other data. Additionally, the processor 508 can control and/or reference one or more resources or components (e.g., 522, 510, 514, 516, 518) of the data module 106. Additionally, the processor 508 can execute one or more set of applications 514 or other software, modules, applications, logic, code, or the like, to perform calculations and/or processing associated with the implementations described herein.

Figure 6:
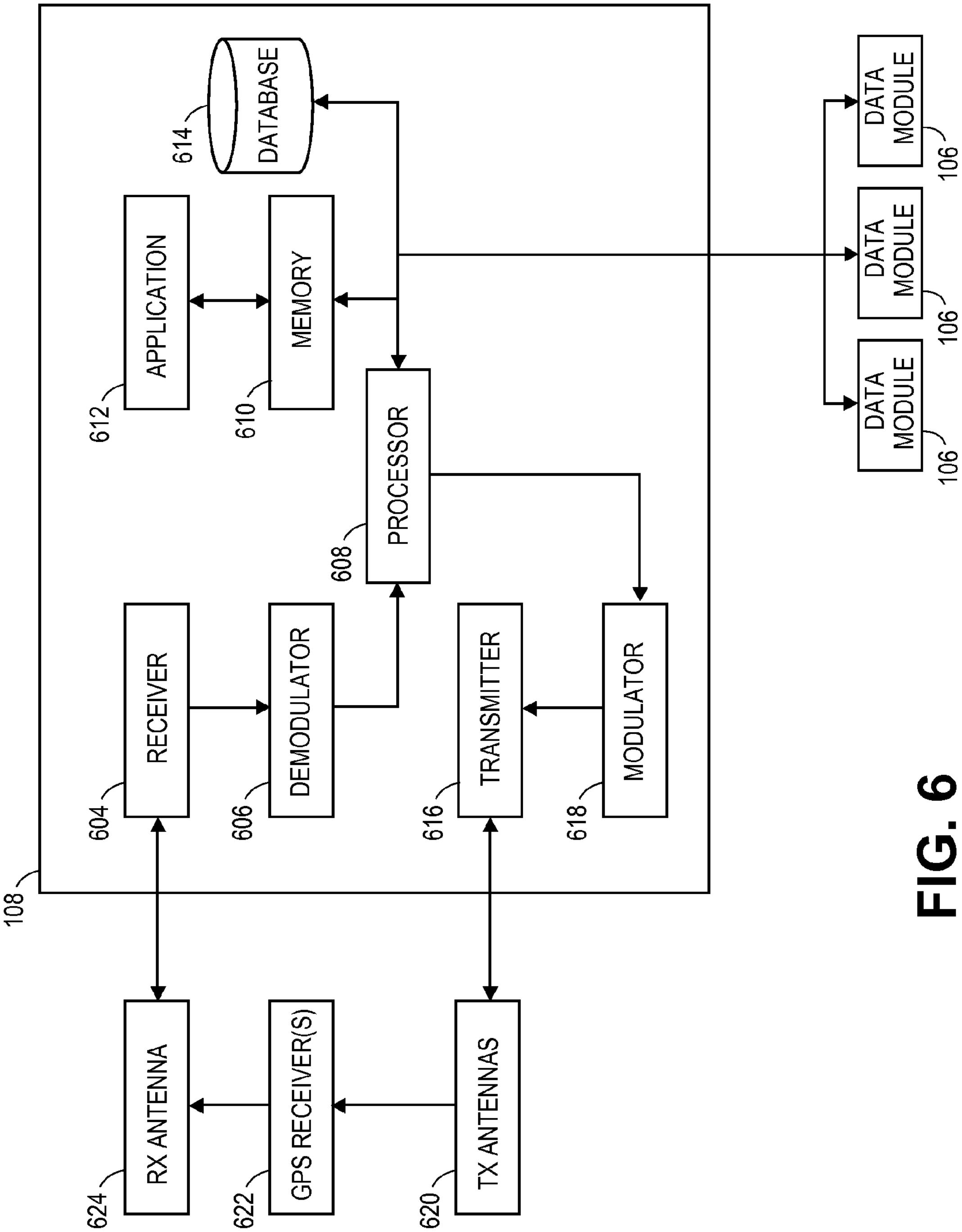
FIG. 6 illustrates an exemplary hardware configuration of a module used in processing vehicle data according to various implementations.

FIG. 6 illustrates an exemplary hardware configuration of a system including a processing module, such as the processing module 108 of the network management center 102, according to various implementations. The processing module 108 can comprise a base receiver (e.g., access point, data storage, cell tower, etc.) with a receiver 604 that can receive signal(s) from one or more GPS receivers 622, or other satellite data receivers, through one or more receive antennas 624, and a transmitter 616 that transmits to the one or more GPS receivers 622 through a transmit antenna 622. The receiver 604 can receive information from one or more receive antennas 624 and be operatively associated with a demodulator 606 that can demodulate received information.

A processor 608 can analyze demodulated signals provided by demodulator 606. The processor 608 can further couple to a modulator 618 and a memory 610 that can store one or more applications 612 that can execute, support, facilitate and/or participate in calculation and communication techniques as described in implementations contained herein. A database 614 can be coupled to the processor 608 and the memory 610 and can be configured to store location and vehicle operational data including, for example, roadway location information, TiTG data, current gear and TG data, user log in and log out events, and other data. The applications 612 can be configured to, for example, compute the TiTG data of vehicles using the data received sensors coupled to the vehicles, in accordance with implementations described herein. The processor 608 can be figured to provide data or notifications relating to the data to the data modules 106 over a cellular network, a satellite network, a personal area network, a local area network, a metropolitan area network, a wide area network, the Internet, an intranet, an extranet, a virtual private network, a peer-to-peer network, or a wireless self-configuring network.

The foregoing description is illustrative, and variations in configuration and implementation may occur to persons skilled in the art. For instance, the various illustrative logics, logical blocks, modules, and circuits described in connection with the implementations disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

In one or more exemplary implementations, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the elements described herein can also be included within the scope of computer-readable media.

The processing of a method or algorithm described in connection with the implementations disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium is coupled to the processor, such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

What is claimed is:

1. A method of processing data associated with a vehicle, comprising:

determining that a speed of the vehicle is greater than a threshold amount;

computing an initial gear ratio of the vehicle in response to the determination that the speed of the vehicle is greater than the threshold amount;

determining that the top gear gear ratio of the vehicle is not set;

setting the top gear gear ratio of the vehicle to the initial gear ratio of the vehicle in response to the determination that the top gear gear ratio of the vehicle is not set;

computing, by a processor, a current gear ratio of the vehicle during an operation of the vehicle;

determining whether the current gear ratio matches the top gear gear ratio; and collecting operation data of the vehicle during the operation of the vehicle in the current gear ratio if the current gear ratio matches the top gear gear ratio.

2. The method of claim 1, wherein the operation data comprises an amount of time that the vehicle is operating in the current gear ratio when the current gear ratio matches the top gear gear ratio.

3. The method of claim 1, further comprising:

providing the operation data to an operator of the vehicle via a user interface.

4. The method of claim 1, wherein the top gear gear ratio is not available via a data bus of the vehicle.

5. The method of claim 1, wherein, when neither the current gear ratio nor the top gear gear ratio is available via a data bus, further comprising:

determining that the speed of the vehicle is greater than the threshold amount;

obtaining the current gear ratio of the vehicle in response to the determination that the speed of the vehicle is greater than the threshold amount;

determining that the current gear ratio of the vehicle is greater than the top gear gear ratio of the vehicle;

setting the top gear gear ratio of the vehicle to the current gear ratio of the vehicle in response to the determination that the current gear ratio of the vehicle is greater than the top gear gear ratio of the vehicle; and resetting existing operation data of the vehicle.

6. The method of claim 1, wherein collecting the operation data of the vehicle comprises:

determining, during the operation of the vehicle, that the current gear ratio of the vehicle matches the top gear gear ratio of the vehicle; and updating the operation data of the vehicle in response to determining that the current gear ratio of the vehicle matches the top gear gear ratio of the vehicle.

7. The method of claim 1, further comprising:

transmitting the operation data to a server located remote from the vehicle.

8. A data processing device of a vehicle, comprising:

a wireless interface; and a processor, communicating with the wireless interface, the processor being configured to— determine that a speed of the vehicle is greater than a threshold amount;

compute an initial gear ratio of the vehicle in response to the determination that the speed of the vehicle is greater than the threshold amount;

determine that the top gear gear ratio of the vehicle is not set;

set the top gear gear ratio of the vehicle to the current gear ratio of the vehicle in response to the determination that the top gear gear ratio of the vehicle is not set;

detect a current gear ratio of the vehicle during an operation of the vehicle;

determine whether the current gear ratio matches the top gear gear ratio; and collect operation data of the vehicle during the operation of the vehicle in the current gear ratio if the current gear ratio matches the top gear gear ratio.

9. The data processing device of claim 8, wherein the operation data comprises an amount of time that the vehicle is operating in the current gear ratio when the current gear ratio matches the top gear gear ratio.

10. The data processing device of claim 8, wherein the processor is further configured to:

provide the operation data to an operator of the vehicle via a user interface.

11. The data processing device of claim 8, wherein the top gear gear ratio is not available via a data bus of the vehicle.

12. The data processing device of claim 8, wherein collecting the operation data of the vehicle comprises:

determining, during the operation of the vehicle, that the current gear ratio of the vehicle matches the top gear gear ratio of the vehicle; and updating the operation data of the vehicle in response to determining that the current gear ratio of the vehicle matches the top gear gear ratio of the vehicle.

13. The data processing device of claim 8, wherein the processor is further configured to:

transmit, via the wireless interface, the operation data to a server located remote from the vehicle.

14. A system for processing data associated with a vehicle, comprising:

means for providing a wireless interface; and means for processing the data of the vehicle, communicating with the means for providing a wireless interface, the means for processing being configured to:

determine that a speed of the vehicle is greater than a threshold amount compute an initial gear ratio of the vehicle in response to the determination that the speed of the vehicle is greater than the threshold amount;

determine that the top gear gear ratio of the vehicle is not set;

set the top gear gear ratio of the vehicle to the initial gear ratio of the vehicle in response to the determination that the top gear gear ratio of the vehicle is not set;

compute a current gear ratio of the vehicle during an operation of the vehicle;

determine whether the current gear ratio matches the top gear gear ratio; and collect operation data of the vehicle during the operation of the vehicle in the current gear ratio if the current gear ratio matches the top gear gear ratio.

15. The system of claim 14, wherein the operation data comprises an amount of time that the vehicle is operating in the current gear ratio when the current gear ratio matches the top gear gear ratio.

16. The system of claim 14, wherein the processor is further configured to:

provide the operation data to an operator of the vehicle via a user interface.

17. The system of claim 14, wherein the top gear gear ratio is not available via a data bus of the vehicle.

18. The system of claim 14, wherein collecting the operation data of the vehicle comprises:

determining, during the operation of the vehicle, that the current gear ratio of the vehicle matches the top gear gear ratio of the vehicle; and updating the operation data of the vehicle in response to determining that the current gear ratio of the vehicle matches the top gear gear ratio of the vehicle.

19. The system of claim 14, wherein the processor is further configured to:

transmit the operation data to a server located remote from the vehicle.

20. A computer program product, comprising:

a non-transitory computer-readable medium comprising:

at least one instruction for causing a computer to determine that a speed of the vehicle is greater than a threshold amount;

at least one instruction for causing a computer to obtain an initial gear ratio of the vehicle in response to the determination that the speed of the vehicle is greater than the threshold amount;

at least one instruction for causing a computer to determine that the top gear gear ratio of the vehicle is not set;

at least one instruction for causing a computer to set the top gear gear ratio of the vehicle to the initial gear ratio of the vehicle in response to the determination that the top gear gear ratio of the vehicle is not set;

at least one instruction for causing a computer to detect a current gear ratio of the vehicle during an operation of the vehicle;

at least one instruction for causing a computer to determine whether the current gear ratio matches the top gear gear ratio; and at least one instruction for causing a computer to collect operation data of the vehicle during the operation of the vehicle in the current gear ratio if the current gear ratio matches the top gear gear ratio.

21. The computer program product of claim 20, wherein the operation data comprises an amount of time that the vehicle is operating in the current gear ratio when the current gear ratio matches the top gear gear ratio.

22. The computer program product of claim 20, wherein the computer-readable medium further comprises at least one instruction for causing a computer to provide the operation data to an operator of the vehicle via a user interface.

23. The computer program product of claim 20, wherein the top gear gear ratio is not available via a data bus of the vehicle.

24. The computer program product of claim 20, wherein collecting the operation data of the vehicle comprises:

determining, during the operation of the vehicle, that the current gear ratio of the vehicle matches the top gear gear ratio of the vehicle; and updating the operation data of the vehicle in response to determining that the current gear ratio of the vehicle matches the top gear gear ratio of the vehicle.

25. The computer program product of claim 20, wherein the computer-readable medium further comprises at least one instruction for causing a computer to transmit the operation data to a server located remote from the vehicle.

26. A method of processing data associated with a vehicle, comprising:

identifying a top gear of the vehicle;

receiving operation data of the vehicle during an operation of the vehicle, wherein the operation data comprises a speed of the vehicle and an RPM of an engine of the vehicle;

computing, by a processor, a current gear of the vehicle based on the speed of the vehicle and the RPM of the engine;

determining whether the current gear matches the top gear; and processing the operation data of the vehicle if the current gear matches the top gear.

27. The method of claim 26, wherein processing the operation data comprises determining an amount of time that the vehicle is operating in the current gear when the current gear matches the top gear.

28. The method of claim 26, further comprising:

providing the operation data that was processed to an operator of the vehicle via a network.

29. The method of claim 26, wherein the operation data of the vehicle is received via a wireless network comprising at least one of a satellite network, a Wi-Fi network, or a cellular data network.

30. The method of claim 26, wherein, when the top gear is not available via a data bus, identifying the top gear of the vehicle comprises:

determining, from the operation data, that a speed of the vehicle is greater than a threshold amount;

detecting, from the operation data, the current gear of the vehicle in response to the determination that the speed of the vehicle is greater than the threshold amount;

determining that the top gear of the vehicle is not set; and setting the top gear of the vehicle to the current gear of the vehicle in response to the determination that the top gear of the vehicle is not set.

31. The method of claim 26, wherein, when neither the current gear nor the top gear is available via a data bus, identifying the top gear of the vehicle comprises:

determining, from the operation data, that a speed of the vehicle is greater than a threshold amount;

detecting, from the operation data, the current gear of the vehicle in response to the determination that the speed of the vehicle is greater than the threshold amount;

determining that the current gear of the vehicle is greater than the top gear of the vehicle;

setting the top gear of the vehicle to the current gear of the vehicle in response to the determination that the current gear of the vehicle is greater than the top gear of the vehicle; and resetting existing operation data of the vehicle.

32. The method of claim 26, wherein processing the operation data of the vehicle comprises:

examining the operation data to determine that the current gear of the vehicle matches the top gear of the vehicle; and updating the operation data of the vehicle in response to determining that the current gear of the vehicle matches the top gear of the vehicle.

33. A system for processing data associated with a vehicle, comprising:

a server being configured to:

identify a top gear of the vehicle;

receive operation data of the vehicle during an operation of the vehicle, wherein the operation data comprises a speed of the vehicle and an RPM of an engine of the vehicle;

compute a current gear of the vehicle based on the speed of the vehicle and the RPM of the engine;

determine whether the current gear matches the top gear; and process the operation data of the vehicle if the current gear matches the top gear.

34. The system of claim 33, wherein processing the operation data comprises determining an amount of time that the vehicle is operating in the current gear when the current gear matches the top gear.

35. The system of claim 33, wherein the server is further configured to:

provide the operation data that was processed to an operator of the vehicle via a network.

36. The system of claim 33, wherein, when the top gear is not available via a data bus, identifying the top gear of the vehicle comprises:

determining, from the operation data, that a speed of the vehicle is greater than a threshold amount;

detecting, from the operation data, the current gear of the vehicle in response to the determination that the speed of the vehicle is greater than the threshold amount;

determining that the top gear of the vehicle is not set; and setting the top gear of the vehicle to the current gear of the vehicle in response to the determination that the top gear of the vehicle is not set.

37. The system of claim 33, wherein, when neither the current gear nor the top gear is available via a data bus, identifying the top gear of the vehicle comprises:

determining, from the operation data, that a speed of the vehicle is greater than a threshold amount;

detecting, from the operation data, the current gear of the vehicle in response to the determination that the speed of the vehicle is greater than the threshold amount;

determining that the current gear of the vehicle is greater than the top gear of the vehicle;

setting the top gear of the vehicle to the current gear of the vehicle in response to the determination that the current gear of the vehicle is greater than the top gear of the vehicle; and resetting existing operation data of the vehicle.

38. The system of claim 33, wherein processing the operation data of the vehicle comprises:

examining the operation data to determine that the current gear of the vehicle matches the top gear of the vehicle; and updating the operation data of the vehicle in response to determining that the current gear of the vehicle matches the top gear of the vehicle.

39. A system for processing data associated with a vehicle, comprising:

means for providing a wireless interface; and means for processing the data associated with the vehicle, communicating with the means for providing a wireless interface, the means for processing being configured to:

identify a top gear of the vehicle;

receive, via the wireless interface, operation data of the vehicle during an operation of the vehicle, wherein the operation data comprises a speed of the vehicle and an RPM of an engine of the vehicle;

compute a current gear of the vehicle based on the speed of the vehicle and the RPM of the engine;

determine whether the current gear matches the top gear; and process the operation data of the vehicle if the current gear matches the top gear.

40. The system of claim 39, wherein processing the operation data comprises determining an amount of time that the vehicle is operating in the current gear when the current gear matches the top gear.

41. The system of claim 39, wherein the processor is further configured to:

provide, via the wireless interface, the operation data that was processed to an operator of the vehicle via a network.

42. The system of claim 39, wherein, when the top gear is not available via a data bus, identifying the top gear of the vehicle comprises:

determining, from the operation data, that a speed of the vehicle is greater than a threshold amount;

detecting, from the operation data, the current gear of the vehicle in response to the determination that the speed of the vehicle is greater than the threshold amount;

determining that the top gear of the vehicle is not set; and setting the top gear of the vehicle to the current gear of the vehicle in response to the determination that the top gear of the vehicle is not set.

43. The system of claim 39, wherein, when neither the current gear nor the top gear is available via a data bus, identifying the top gear of the vehicle comprises:

determining, from the operation data, that a speed of the vehicle is greater than a threshold amount;

detecting, from the operation data, the current gear of the vehicle in response to the determination that the speed of the vehicle is greater than the threshold amount;

determining that the current gear of the vehicle is greater than the top gear of the vehicle;

setting the top gear of the vehicle to the current gear of the vehicle in response to the determination that the current gear of the vehicle is greater than the top gear of the vehicle; and resetting existing operation data of the vehicle.

44. The system of claim 39, wherein processing the operation data of the vehicle comprises:

examining the operation data to determine that the current gear of the vehicle matches the top gear of the vehicle; and updating the operation data of the vehicle in response to determining that the current gear of the vehicle matches the top gear of the vehicle.

45. A computer program product, comprising:

a non-transitory computer-readable medium comprising:

at least one instruction for causing a computer to identify a top gear of a vehicle;

at least one instruction for causing a computer to receive operation data of the vehicle during an operation of the vehicle, wherein the operation data comprises a speed of the vehicle and an RPM of an engine of the vehicle;

at least one instruction for causing a computer to compute a current gear of the vehicle based on the speed of the vehicle and the RPM of the engine;

at least one instruction for causing a computer to determine whether the current gear matches the top gear; and at least one instruction for causing a computer to process the operation data of the vehicle if the current gear matches the top gear.

46. The computer program product of claim 45, wherein processing the operation data comprises determining an amount of time that the vehicle is operating in the current gear when the current gear matches the top gear.

47. The computer program product of claim 45, wherein the computer-readable medium further comprises at least one instruction for causing a computer to provide the operation data that was processed to an operator of the vehicle via a network.

48. The computer program product of claim 45, wherein, when the top gear is not available via a data bus, identifying the top gear of the vehicle comprises:

determining, from the operation data, that a speed of the vehicle is greater than a threshold amount;

detecting, from the operation data, the current gear of the vehicle in response to the determination that the speed of the vehicle is greater than the threshold amount;

determining that the top gear of the vehicle is not set; and setting the top gear of the vehicle to the current gear of the vehicle in response to the determination that the top gear of the vehicle is not set.

49. The computer program product of claim 45, wherein, when neither the current gear nor the top gear is available via a data bus, identifying the top gear of the vehicle comprises:

determining, from the operation data, that a speed of the vehicle is greater than a threshold amount;

detecting, from the operation data, the current gear of the vehicle in response to the determination that the speed of the vehicle is greater than the threshold amount;

determining that the current gear of the vehicle is greater than the top gear of the vehicle;

setting the top gear of the vehicle to the current gear of the vehicle in response to the determination that the current gear of the vehicle is greater than the top gear of the vehicle; and resetting existing operation data of the vehicle.

50. The computer program product of claim 45, wherein processing the operation data of the vehicle comprises:

examining the operation data to determine that the current gear of the vehicle matches the top gear of the vehicle; and updating the operation data of the vehicle in response to determining that the current gear of the vehicle matches the top gear of the vehicle.

* * * * *